United States Patent [19]

Fricker

[11] Patent Number: 4,644,975

[45] Date of Patent: Feb. 24, 1987

[54] DEVICE FOR PREVENTING RUPTURING OF A PIPELINE

[75] Inventor: Hans Fricker, Rickenback-Attikon, Switzerland

[73] Assignee: Sulzer Brothers Limited, Winterthur, Switzerland

[21] Appl. No.: 701,084

[22] Filed: Feb. 13, 1985

[30] Foreign Application Priority Data

Feb. 13, 1984 [CH] Switzerland .......................... 669/84

[51] Int. Cl.$^4$ ............................ F16L 1/00; F16L 9/22
[52] U.S. Cl. ...................................... 138/110; 138/99; 138/172; 138/178
[58] Field of Search ................. 138/99, 106, 110, 112, 138/178, 172

[56] References Cited

U.S. PATENT DOCUMENTS

| 1,242,060 | 10/1917 | Smakal | 138/99 |
| 1,816,421 | 7/1931 | Clark et al. | 138/99 X |
| 1,877,094 | 9/1932 | Walborn | 138/99 X |
| 3,349,807 | 10/1967 | Penman | 138/172 |
| 3,377,757 | 4/1968 | Magers | 138/172 X |
| 4,103,505 | 8/1978 | Howerton | 138/110 X |
| 4,327,473 | 5/1982 | Somerville | 138/172 X |
| 4,449,852 | 5/1984 | Muszynski | 138/172 X |

FOREIGN PATENT DOCUMENTS 99317 9/1938 Austria .............................. 138/172

*Primary Examiner*—James E. Bryant, III
*Attorney, Agent, or Firm*—Kenyon & Kenyon

[57] ABSTRACT

The device for obviating or making difficult the rupturing of a pipeline having a risk zone includes, in one embodiment, a plurality of tension bars which bridge the risk zone and tensioning bands which extend peripherally about the tension bars to press the bars against the pipeline at the respective ends.

In other embodiments, tension pins are disposed at the ends in arcuate segments which circumferentially surround the pipeline on opposite sides of a rupture zone while tensioning bands in the form of chains surround the arcuate segments in order to press the segments against the pipeline.

19 Claims, 11 Drawing Figures

DEVICE FOR PREVENTING RUPTURING OF A PIPELINE

This invention relates to a device for preventing rupturing of a pipeline. More particularly, this invention relates to a device to obviate or make difficult the rupturing of a pipeline having a risk zone.

In the practical operation of plants subject to sever thermal and strength stresses and also having to comply with strict safety rules, for example, in the chemical industry and more particularly in nuclear plants, it has been found that minor damage to the material of piplines often leads to substantial losses. This is because undesirable and often lengthy interruptions in the operation of a complete plant are necessary to clear the damage.

A representative case of this kind is familiar to operators of power stations which use boiling water nuclear reactors in which the combined effect of sever mechanical stresses caused by high pressures, thermal stresses caused by high temperatures, chemical corrosion and irradiation have led to cracks in the weld seams of the pipelines of the primary circuit. It is forbidden for the reactor to continue operating after cracks of this kind, which may lead to a line fracture, have been detected. As a result, the power station has to be shut down for several days while the affected line is repaired. Thus, substantial financial losses are incurred.

Accordingly, it is an object of the invention to provide a device of relatively simple construction to obviate or impede rupturing of a pipeline at a rupture-risk zone.

It is another object of the invention to provide a device which is capable of minimizing the amount of medium which may issue through a leak in a pipeline due to a rupturing of the pipeline.

It is another object of the invention to provide a device which can be mounted on a pipeline about a rupturerisk zone to minimize the risk of rupturing.

Briefly, the invention provides a pipeline having a rupture-risk zone with a device for preventing rupturing of the pipeline in this zone. This device includes at least one tension bar which is secured to a peripheral surface of a pipeline on opposite sides of the risk zone and at least one tensioning band which extends peripherally about the pipeline and the tension bar in order to press the tension bar against the pipeline.

The devie is constructed to be very readily assembled. Basically, the tension bar can be secured to a pipeline solely by friction so that the surface of the pipeline can be treated gently. Another advantage is that the devie can usually be constructed for a working life at least as great as the remaining life of the particular plant in which the pipeline is disposed. This permits considerable freedom in chosing the final repair time.

Additional advantages of the device reside in the simplicity of construction and the many possible variants which enable the device to be adapted to existing physical circumstances.

The device may be constructed with a plurality of tension bars which are distributed uniformly about the peripheral surface of the pipeline. This provides a satisfactory distribution of the stressing of the pipeline.

In some cases, a pipeline may have a working temperature different from the normal temperature when not in operation. In such cases, in order to provide maximum safety against rupturing, the pipeline and tension bar are made of materials which have different coefficients of heat expansion from each other. Since the tension bar is in heat-conductive relationship with the pipeline, the pipeline and the tension bar are at substantially the same temperature in operation and the relative shortening of the tension bar upon the change from the out-of-operation temperature to the working temperature, such shortening being due to the different heat expansion coefficients, produces a force which reduces the stressing of the risk zone. Such force is a function of the heat expansion coefficients of the tension bar and of the pipeline, of the temperature difference in the pipeline wall between "out of operation" and "in operation" and the strength characteristics of the tension bar. The force can therefore be calculated in advance or optimized to a considerable extent. It is often necessary in this case for the tension bar to be prestressed. That is, it is merely necessary to ensure that there is no clearance between the tension bar and the line before the plant is taken into operation.

In cases where the pressure required between the pipeline and the tension bar is low, the engagement of the tension bar with the pipeline surface may be low so as not to impair strength. For example, the pipeline may be provided with peripheral grooves while the tension bar is provided with a tooth system at least on one end which is able to engage with the peripheral grooves of the pipeline. Alternatively, the pipeline may be provided with at least one recess in the peripheral surface while the tension bar is provided with a bore in radial alignment with the recess. In this case, a pin is placed in the bore and the recess in order to provide engagement. Further, a disc may be threaded into the bore in order to secure the pin in place.

The tensioning band which is employed in the device may be in the form of a wire rope or in the form of a chain. In either case, a very simple and compact element is provided for pressing the tension bar on to the pipeline. Of course, any other suitable means may also be provided for pressing the tension bar on to the pipeline.

In the case where the tensioning band is in the form of a chain, the chain may be made up in a plurality of links with a pivot pin securing at least some of the links together. In this case, an eccentric may be positioned between the pivot pin and one of the links for adjusting the tension in the chain. In this way, considerable pressure may be applied by turning of the eccentric.

In order to facilitate the obviation of clearance and, where applicable, the production of a prestress between the tension bar and the pipeline in a simple manner, the device may include a plurality of tension bars about the pipeline and a plurality of annular segments which are also disposed about the pipeline on opposite sides of the risk zone with each segment receiving one end of at least one tension bar therein. Further, in order to optimize the engagement of the device with the pipeline, at least one two armed bent lever can be positioned between the tensioning band and at least one of the tension bars. The lever is further positioned to be in pivotal contact with the annular segment receiving the tension bar with one arm extending from the band radially towards the pipeline and the second arm extending substantially parallel to the pipeline under the stress from the tension in the tension bar.

In order to ensure an absence of clearance and to provide a biasing between the tension bar and the pipeline, the tension bar may be provided with a tooth system at one end which has tooth tips lying on a helix which extends around the pipeline. In addition, the device is provided with a grooved intermediate member between the pipeline and the tension bar which is in engagement with the tooth system as well as means for securing the intermediate element to the tension bar.

In still another embodiment, wherein the pipeline includes a pipe bend adjacent to the risk zone, the device includes at least two interconnected shell-like components which are disposed about and which engage the pipe bend. In this case, the shelllike components also engage with the tension bar.

These and other obejcts and advantages of the invention will become more apparent from the following detailed description taken in conjunction with the accompanying drawings wherein:

Figure 1:
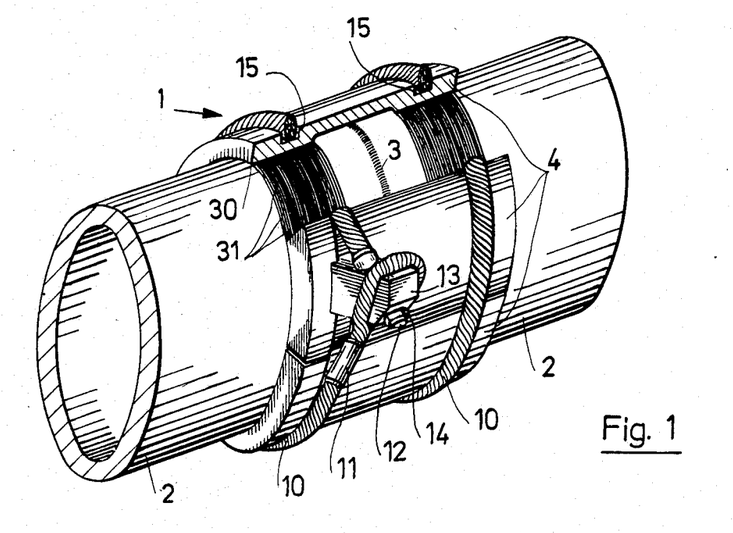
FIG. 1 illustrates a perspective view in diagrammatic form of a device according to the invention.

Referring to FIG. 1, a pipeline includes two portions or sections 2 which are interconnected by means of a peripheral weld seam 3 which is a rupture-risk zone of the line. The pipeline conveys, for instance, a hot medium of a nuclear reactor plant. A device 1 for obviating rupturing of the pipeline at the weld seam 3 is disposed about the pipeline to streddle the weld seam 3. As indicated, this device 1 has six parallel tension bars 4 which are in heat-conductive relationship with the pipe sections 2 on either side of the weld seam 3 and which are uniformly distributed about the peripheral surface of the pipeline to extend across the seam 3. The device 1 also has a pair of tensioning bands in the form of steel ropes 10 which extend around the line and the bars 4 and press the bars 4 on to the pipe sections 2.

One end of each rope 10 forms a loop held together by a holder 11 while the other end engages in a screwthreaded substantially cylindrical rope termination 12. Each rope 10 is also disposed in a rectangular section groove 15 in the bars 4. An anchor station 13 is disposed in each groove 15 around which the rope loop is laid and which is formed with a bore to receive the rope termination 12. An adjusting nut 14 is disposed on the screwthread of each termination 12 and serves to tighten the rope 10 so that the bars 4 are pressed on to the respective pipe sections 2. Preferably, the anchor stations 13 are distributed uniformly over the line periphery.

The bars 4 have a tooth system 30 at both ends which co-operates with peripheral grooves 31 in the pipe sections 2. The teeth of the system 30 and the grooves 31 must be produced to an accuracy such that when the device 1 is assembled—assembly being carried out when the line is not in operation—i.e., at a low temperature—no substantial clearance is present between the bars 4 and the pipe sections 2. In this example, the pipe sections 2 are made of an austenitic steel and the bars 4 are made of a ferritic material, so that the pipe sections 2 have a greater heat expansion coefficient than the bars 4. When the line changes over to its working temperature, the pipe sections 2 expand more than the bars 4, so that a force is produced which pulls the pipe sections 2 towards one another and thus reduces the loading or stressing of the weld seam 3.

Figure 2:
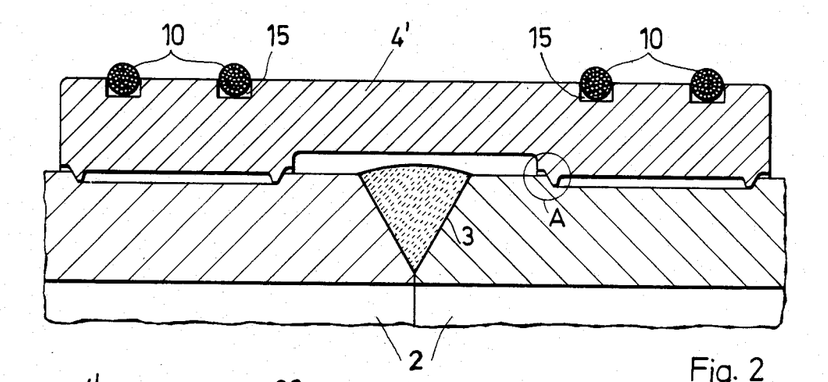
FIG. 2 illustrates a longitudinal section through a part of a pipeline having a device slightly modified as compared with FIG. 1.

Referring to FIG. 2, which in other respects is identical to the embodiment shown in FIG. 1, four steel ropes 10 are used to press the ends of the tension bars against the pipeline. In this case also, the anchor stations 13 (not shown) are distributed uniformly over the periphery of the pipe sections 2. In both FIGS. 1 and 2, the steel ropes 10 are so disposed as to apply a very uniform loading to the tooth system of the tension bars 4 (FIG. 1) and 4' (FIG. 2).

Figure 3:
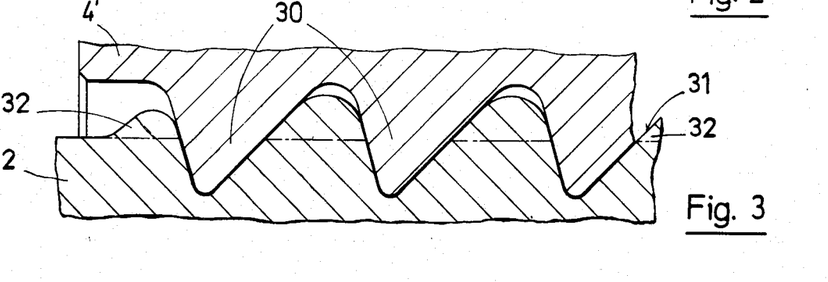
FIG. 3 illustrates a view to a larger scale than FIG. 2 of a part of the tooth system of the tension bar.

The tooth system 30 of the tension bars 4' which is shown in FIG. 3 is representative of the tooth system of FIG. 1. The grooves 31 are contrived in the pipe sections 2 perpendicularly to the line length by roll forming with the use of a machine which is known per se but specially designed for these particular circumstances. Material 32 forced out by the roll forming forms a component of the grooves 31. The grooves 31 can be formed by the removal of material but roll forming is preferably on grounds of strength. Considerations of strength dictate that the grooves 31 be as shallow as possible. The teeth of the tooth system 30 are formed either by milling or roll forming, preferably inside a ring which is subsequently divided into six segments forming the tension bars 4, 4'.

Depending upon the marginal conditions of the particular case concerned, the ropes used can be made of a material other than steel.

Figure 4:
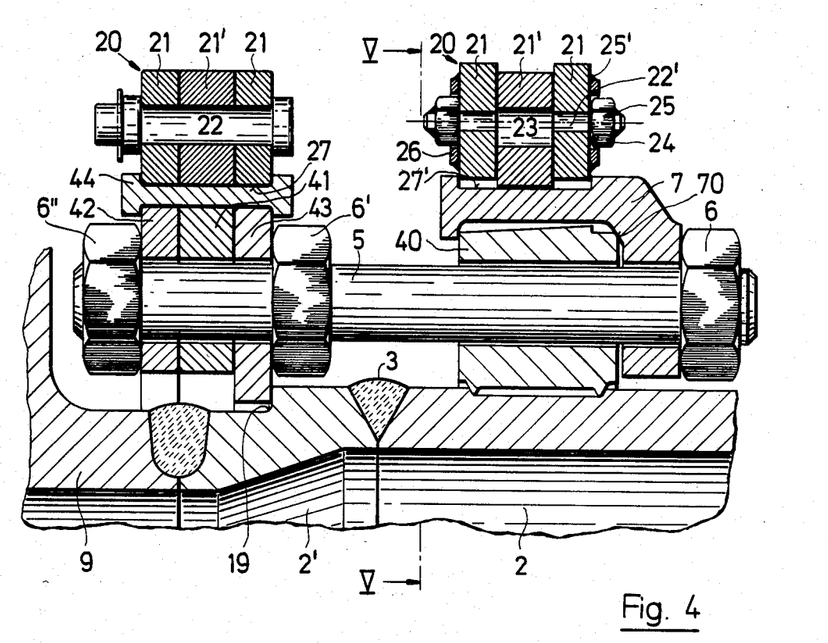
FIG. 4 illustrates a longitudinal section through another embodiment of the invention.
Figure 5:
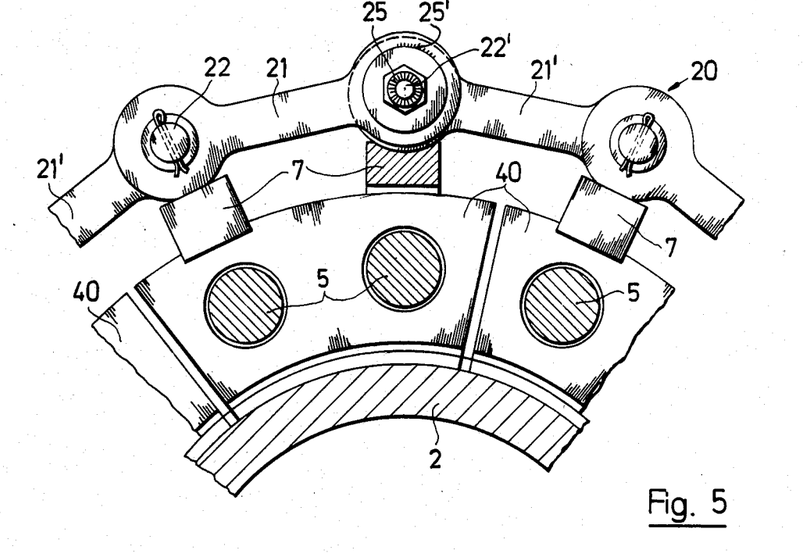
FIG. 5 illustrates a view taken on line V—V of FIG. 4.

Referring to FIGS. 4 and 5, the device for precluding a rupture of the pipeline at the weld seam 3 may alternatively be constructed of tension bars in the form of tension pins 5 for example, twelve pins 5 about the pipeline with every two pins 5 extending through one of a circumferential series of annular connecting segments 40. As shown, each segment 40 is formed with two bores to receive the pins 5 and is disposed on one side of the weld seam 3. On the other side thereof, the two pins 5 extend in an annular connecting segment 41 disposed between a covering segment 42 and a covering segment 43, the latter being prolonged radially inwardly. As considered lengthwise of the line, the segments 41 and the segments 42 are identical and are each formed with bores through which two pins 5 extend. The prolonged segments 43 differ from the segments 42 only by being higher than the latter.

As considered lengthwise of the line, the segments 40, 41, on the one hand, and the segments 42, 43, on the other hand, face one another exactly, the segments 42, 43 being staggered in relation to the segments 40, 41, by one between-holes spacing—i.e. 30° in the present case.

As indicated in FIG. 4, two nuts 6", 6" hold the segments 41 and the segments 42, 43 together while a single nut 6 is threaded onto the other end of each pin 5. In this example, the pipline merges into a fitting 9, one line portion 2' having a shoulder 19 which the prolongation of the segments 43 engages. The elemnents 40 also have a tooth system of the kind shown in FIG. 3.

In FIGS. 4 and 5, two chains 20 are used as the tensioning bands to press the tension pins 5 on to the pipe sections 2, 9. The chains 20 comprise outer links 21 and inner links 21' which are pivotally interconnected in known manner by means of pivot pins 22, 22'. Every other pivot pin 22' also carries on eccentric 23 near the inner link 21' and a pivot nut 24 at each end. After assembly of the chain, the nuts 24 are rigidly connected to the pivot pins 22' by means of securing weld seams 25. Consequently, the chains 20 can be drawn very tight just by turning the pivot pins 22' and, once a required chain tension has been reached, secured in position by means of fixing discs 26. Accordingly, each such disc 26 is formed centrally with a hexagonal aperture which is intimately adapted to the nut 24, so that the disc 26 can be pushed over the nut 24 and secured by a securing weld seam 25' to an outer link 21.

Between the left-hand chain 20 of FIG. 4, on the one hand, and the segments 41 and segments 42, 43 on the other hand, two bottom support members 44 are provided per connecting segment 41 and each has a trough 27 providing very good bearing for the chain 20.

Referring to FIG. 4 a two-armed bent lever 7 is located between the right-hand chain 20 and the connecting segments 40, per each tension pin 5. One lever arm of the bent lever 7 extends substantially parallel to the pipeline while the other lever arm extends from the chain 20 between the nut 6 and the segment 40 radially towards the pipeline. When the device is completely assembled, the lever 7 is in pivotal contact merely by way of a pivot point 70 with the segment 40. At the point 70, the moments caused by a radial reaction force of the chain 20 and by the tension of the pin 5 are opposite and equal and the resultant force through the point 70 extends through the tooth system between the segment 40 and the pipeline section 2. The connecting segments 40 therefor bear optimally on the pipeline section 2, disengagement of the connecting segment 40 definitely being precluded since any tension of the pins 5 produces a proportionate radial reaction force of the chain.

Each bent lever 7 has, like the members 44, a trough 27' to bear the chain 20. On the surface distant from the pipeline section, the segments 40 have a reduced inclination which rises from left to right in FIG. 4 and is shown to an exaggerated scale. The inclination ensures that the lever 7 bears solely on the point 70 when the pin 5 experiences tension. The point 70 is usually rounded, but can also be flat and perpendicular to the difrection of the resultant force hereinbefore referred to.

Figure 6:
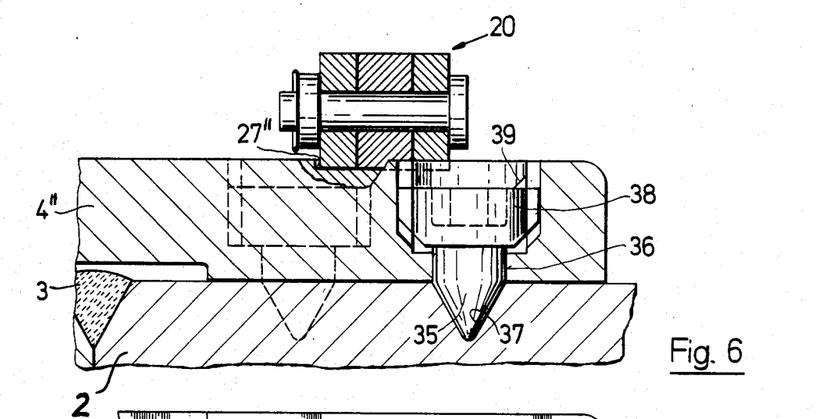
FIG. 6 illustrates a longitduinal section through a part of another embodiment of the invention.
Figure 7:
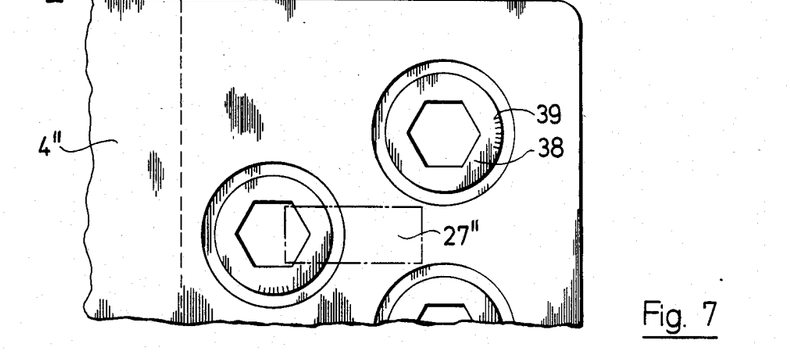
FIG. 7 illustrates a plan view of the device of FIG. 6 but with the link chain omitted.

Referring to FIGS. 6 and 7, wherein like reference characters indicate like parts as above, the rupture-preventing device may be modified so that the tension bars 4" engage the pipeline sections 2 via independent means, for example, pins 35. To this end, each pipeline section 2 is provided with two rows of peripherally disposed recesses 37 while each tension bar 4" is provided with two rows of radial bores 36 with each bore 36 aligned with a recess 37 in the pipeline. As indicated, the pins 35 extend without clearance in the bores 36 of the bars 4" and engage, also without clearance, in the corresponding radial bores 37 in the pipeline section 2. At the end distant from the pipeline section 2, each bore 36 has a screwthread in which a disc 38 having an internal socket of hexagon shape is disposed to retain the pin 35 and ensure that the pin 35 is pressed reliably. The pins 35 are made of a high-strength steel while the discs 38 are made of a readily weldable material in order that they can be secured by weld spots 39 after tightening. In light of the heavy stressing which may occur here, the bores 37 are fine polished and/or hardened by mechanical impacts, hydraulic pressure or explosive forming.

As in the example of FIGS. 4 and 5, the chains 20 contact the bars 4" in troughs 27". The troughs 27" are disposed between two adjacent bores 36 of a row, one bore 36 per trough 27" being omitted in the adjacent row (see the chain-dotted arrangement of a trough 27" in FIG. 7). The chain 20 does not interfere with the tightening and securing of the discs 38, so that after the final preloading or biasing of the chains 20, the pins 35 are pressed reliably.

If required, the weld spots 39 can be broken at disassembly of the device and the pins 35 repressurised.

To obviate clearance and excessive stresses, the bores 37 are drilled only in the initial assembly of the device after the bars 4" have been temporarily secured in their final position by means of relatively thin chains or ropes, the bars 4" themselves serving as templets for the drilling work. This variant does not therefore call for the stringent accuracy necessary in the production of the examples previously described. On the other hand, the tooth system permits the transmission of greater forces per unit of area.

Figures 8, 9:
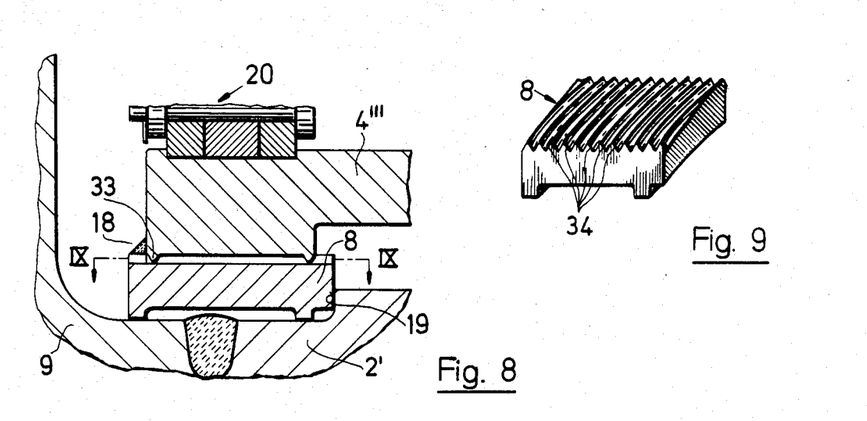
FIG. 8 illustrates a longitudinal section through a part of another modification in accordance with the invention.
FIG. 9 illustrates a perspective view of the component of the device of FIG. 8.

Referring to FIG. 8, wherein like reference characters indicate like parts as above, the pipeline may have a section 2' connected via a weld seam to a fitting 9. In this case, the rupture-preventing device includes an intermediate element 8 between each tension bar 4''' and the pipeline. For example, six tension bars 4''' are pressed by means of a chain 20 over six intermediate elements 8. The intermediate elements 8 are also supported on the shoulder 19 against the tension arising from the bars 4'''. By means of a screwthread, which takes the form of teeth 33 in the bars 4''' and of grooves 34 in the elements 8, the required absence of clearance and, where applicable, reloading or prestressing between each bar 4''' and the pipeline can be adjusted just by moving the elements 8 until they engage the shoulder 19. To this end, the tips (apices) of the teeth 34 are disposed on a helix circumferentially of the pipeline as indicated in FIG. 9. Unwanted movements between the bars 4''' and the elements 8 are prevented by means of spot welds 18.

Figure 10:
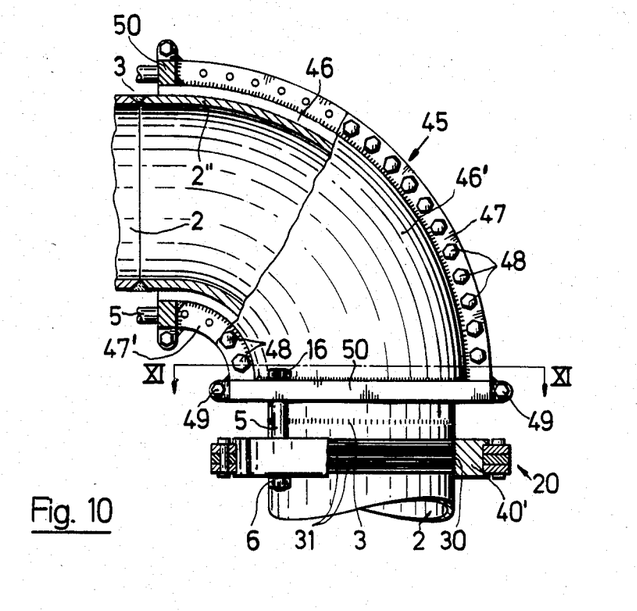
FIG. 10 diagrammatically illustrates, partly sectioned and partly in elevation, of a device according to the invention as used on a pipe bend.
Figure 11:
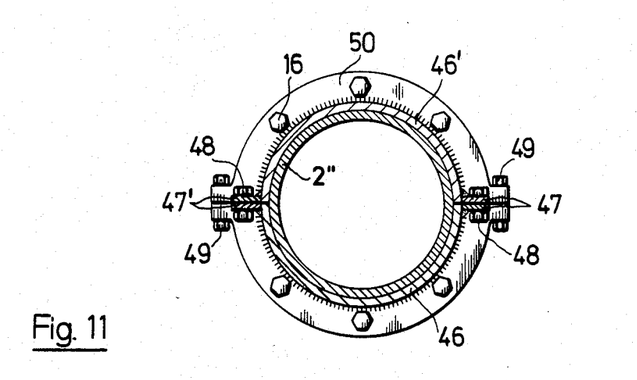
FIG. 11 illustrates a view taken on line 11—11 of FIG. 10.

Referring to FIGS. 10 and 11, two weld seams 3 which connect a pipe bend 2" to the line sections 2 are the risk zones. In this case, the tension pins 5 are secured to the line on the bend side by means of a curved or bent connecting element 45 embodied by two half-shells 46, 46'. These half-shells 46, 46' are disposed both along the longest generatrix and the shortest generatrix of the pipe bend 2" with flanges 47, 47' respectively being interconnected by means of screws 48, so that the shells engaging intimately with the bend 2". A two-element securing ring 50 near each end of the bend 2" is also associated with the curved connecting element 45 and the two parts of the ring 50 are interconnected by means of screws 49 which are parallel to the screws 48. Six tension pins 5 are secured on each ring 50 by means of nuts 16.

On the straight pipe sections 2, the device comprises six annular connecting segments 40' to which the pins 5 are secured by nuts 6 in the same way as they are to the rings 50. The connecting segments 40' have a tooth system which engages in grooves in the straight pipe sections 2 and are pressed thereon by chains 20 in the manner hereinbefore described.

The embodiments described are some preferred applications of the invention which are particularly illustrative. Other variants are possible. For instance, unlike FIG. 3, the tooth system between the tension bar and the line can have symmetrical teeth and grooves. The number of tension bars per device can be varied as required. Also, the number of covering segments 42, 43 may differ from the number of connecting segments 41 and/or 40. Instead of the weld seams 25' of FIG. 4, pins or screws can be used to secure the discs 26.

The device can also be used on pipelines where the working temperature in the pipeline is lower than the out-of-operation temperature, as is the case, for example in refrigeration plants. In this case, the heat expansion coefficient of the pipeline should be less than the heat expansion coefficient of the tension bars.

The invention thus provides a device which can be secured relatively rapidly to a pipeline in a simple way for obviating or impeding rupturing of the pipeline at a zone of risk. The device is particularly suitable for use in pipelines where there is a risk of rupture due to corrosion. Further, if a leak has already occurred, the device can be constructed to ensure that only a harmless amount of medium can issue from the pipeline through the leak and thus, ensures that the leak does not increase.

Where the device includes tension bars which bridge over a risk zone, such as that a weld seam, the tension bars are pressed in seal-tight relationship to the pipeline by the tension bands so as to reduce the risk of leakage should a rupture actually occur in the weld seam.

What is claimed is:

1. In combination with a pipeline having a rupture-risk zone and peripheral grooves in a peripheral surface, a device for preventing rupture of said pipeline in said risk zone, said device including
    a plurality of tension bars secured to and distributed uniformly about said peripheral surface of said pipeline on opposite sides of said risk zone, each said tension bar having a tooth system at least on one end in engagement with said grooves; and
    at least one tensioning band extending peripherally about said pipeline and said tension bars to press said tension bars against said pipeline.

2. The combination as set forth in claim 1 wherein said pipeline and said tension bar have different coefficients of heat expansion from each other.

3. The combination as set forth in claim 1 wherein said tensioning band is a wire rope.

4. The combination as set forth in claim 1 wherein said tensioning band is a chain.

5. The combination as set forth in claim 4 wherein said chain includes a plurality of links, a pivot pin securing said links together and an eccentric between said pivot pin and one of said links.

6. In combination with a pipeline having a rupture-risk zone and at least one recess in a peripheral surface, a device for preventing rupturing of said pipeline in said risk zone, said device including
    a plurality of tension bars distributed uniformly about and secured to said peripheral surface of said pipeline on opposite sides of said risk zone, each said tension bar having a bore in radial alignment with said recess;
    at least one tensioning band extending peripherally about said pipeline and said tension bars to press said tension bars against said pipeline; and
    a pin in each bore and said recess.

7. The combination as set forth in claim 6 wherein said pipeline and said tension bars have different coefficients of heat expansion from each other.

8. The combination as set forth in claim 6 wherein said tensioning band is a wire rope.

9. The combination as set forth in claim 6 wherein said tensioning band is a chain.

10. The combination as set forth in claim 9 wherein said chain includes a plurality of links, a pivot pin securing said links together and an eccentric between said pivot pin and one of said links.

11. The combination as set forth in claim 6 which further comprises a disc threaded into said bore to secure said pin therein.

12. In combination with a pipeline having a rupture-risk zone, a device for preventing rupturing of said pipeline in said risk zone, said device including
    a plurality of tension bars distributed about and secured to a peripheral surface of said pipeline on opposite sides of said risk zone;
    a plurality of annular segments peripherally disposed about said pipeline on opposite sides of said risk zone, each said segment receiving one end of at least one respective tension bar therein; and
    at least one tensioning band extending peripherally about said pipeline and said tension bars to press said tension bars against said pipeline.

13. The combination as set forth in claim 12 which further includes at least one two-armed bent lever between said tensioning band and one of said tension bars, said lever being in pivotal contact with said annular segment receiving said one tension bar and having one arm extending from said band radially towards said pipeline and a second arm extending substantially parallel to said pipeline under stress from tension in said one tension bar.

14. The combination as set forth in claim 13 wherein each said tension bar includes a tooth system at one end thereof, said system having tooth tips lying on a helix extending around said pipeline, and wherein said device further includes a grooved intermediate member between said pipeline and said bars in engagement with said tooth system and means for securing said intermediate element to said tension bars.

15. The combination as set forth in claim 12 wherein said pipeline includes a pipe bend adjacent said risk zone and said device includes at least two interconnected shell-like components disposed about and engaging said pipe bend, said components engaging with said tension bars.

16. The combination as set forth in claim 12 wherein each tension bar includes a tooth system at at least one end and said pipeline has an annular shoulder on at least one side of said zone and wherein said device includes a grooved intermediate member between said pipeline and said tooth system of each said tension bar and abutting said shoulder.

17. The combination with a pipeline having a rupture-risk zone, a device for preventing rupturing of said pipeline in said risk zone, said device including a plurality of annular segments disposed about said pipeline on at least one side of said zone;

a plurality of tension bars distributed about said pipeline and extending through said annular segments across said zone;

a chain disposed about said annular segments for pressing said segments against said pipeline; and means for anchoring said tension bars to said pipeline on an opposite side of said zone.

18. The combination as set forth in claim 17 wherein said chain includes a plurality of links, a pivot pin securing said links together and an eccentric between said pivot pin and one of said links.

19. The combination as set forth in claim 17 which further includes at least one two-armed bent lever between said tensioning band and one of said tension bars, said lever being in pivotal contact with said annular segment receiving said one tension bar and having one arm extending from said band radially towards said pipeline and a second arm extending substantially parallel to said pipeline under stress from tension in said one tension bar.

* * * * *

UNITED STATES PATENT AND TRADEMARK OFFICE
CERTIFICATE OF CORRECTION

PATENT NO. : 4,644,975

DATED : February 24, 1987

INVENTOR(S) : Hans Fricker

It is certified that error appears in the above-identified patent and that said Letters Patent is hereby corrected as shown below:

```
Column 1, line 9  "sever" should be - severe-
Column 1 ,line 14 "plines" should be -pelines-
Column 1, line 20 "sever" should be -severe-
Column 1, line 40 "rupturerisk" should be -rupture-risk-
Column 1, line 49 "devie" should be -device-
Column 1, line 53 "devie" should be -device-
Column 3, line 11 "shelllike" should be -shell-like-
Column 3, line 13 "obejcts" should be -objects-
Column 3, line 28 "longitduinal" should be -longitudinal-
Column 3, line 49 "streddle" should be -straddle-
Column 3, line 39 cancel "of"
Column 4, line 38 "preferably" should be -preferable-
Column 5, line 6  "elemnents" should be -elements-
Column 5, line 44 "therefor" should be -therefore-
Column 5, line 56 "difrection" should be direction-
Column 6, line 45 "reloading" should be -preloading-
Column 6, line 62 "engaging" should be -engage-
Column 7, line 35 "that" should be -at-
Column 8 ,line 45 "13" should be -12-
```

Signed and Sealed this

Fifteenth Day of March, 1988

Attest:

DONALD J. QUIGG

Attesting Officer

Commissioner of Patents and Trademarks